United States Patent [19]

Rawal

[11] 4,134,390

[45] Jan. 16, 1979

[54] SOLAR HEAT ENERGY TRANSFER SYSTEM

[76] Inventor: Davis I. Rawal, 25 Maybrook Rd., Waterbury, Conn. 06708

[21] Appl. No.: 664,010

[22] Filed: Mar. 4, 1976

[51] Int. Cl.² ............................................. F24J 3/02
[52] U.S. Cl. ................................... 126/271; 237/1 A
[58] Field of Search ............... 126/270, 271; 165/168; 417/14, 18, 25; 237/1 A, 9 R; 203/DIG. 1, 91; 202/205

[56] References Cited

U.S. PATENT DOCUMENTS

| | | | |
|---|---|---|---|
| 1,971,242 | 8/1934 | Wheeler | 126/271 |
| 2,342,062 | 2/1944 | Schenk | 126/271 X |
| 2,358,476 | 9/1944 | Routh et al. | 126/271 |
| 2,440,981 | 5/1948 | Smith | 417/25 X |
| 2,448,648 | 9/1948 | Zideck | 126/271 X |
| 3,250,269 | 5/1966 | Sherock | 126/271 |
| 3,330,740 | 7/1967 | Duffy | 202/205 X |
| 3,599,626 | 8/1971 | Bouse | 126/271 |
| 3,916,871 | 11/1975 | Estes et al. | 126/271 |
| 3,929,121 | 12/1975 | Rogers | 126/271 |
| 3,974,822 | 8/1976 | Patil | 126/271 |

Primary Examiner—William F. O'Dea
Assistant Examiner—Larry Jones

[57] ABSTRACT

A solar heating system comprises a solar panel having a liquid inlet and vapor outlet, a conduit connecting the inlet and outlet and having a fluid pump therealong operable to circulate fluid through the solar panel and conduit, and a vacuum pump operable to maintain the pressure within the solar panel below a predetermined value. A condenser containing heat exchange fluid is in heat exchange contact with the conduit intermediate the vapor outlet and fluid pump, preferably by passing a portion of the conduit through the condenser. The lower portion of a liquid storage tank is connected to the solar panel and houses fluid drained therefrom when the system is not operating, the vacuum pump communicating with the upper portion of the tank to facilitate draining the panel. Control means automatically activates the vacuum pump to evacuate the solar panel, initiates operation of the solar heating system if the solar panel temperature exceeds a preset value and pressure is below a preset value, and terminates operation of the system if the solar panel temperature falls below the preset value whereupon the vacuum pump operates for a predetermined time period to facilitate draining the solar panel. The system also terminates operation if the panel pressure exceeds the preset value, whereupon the vacuum pump operates to reduce the pressure within the solar panel.

10 Claims, 4 Drawing Figures

SOLAR HEAT ENERGY TRANSFER SYSTEM

BACKGROUND OF INVENTION

Heating or power generating systems utilizing solar energy are well known and have recently become much more widely used with the recognition of an energy shortage and the correspondingly increased interest in development of alternative energy sources. Various configurations of solar energy systems have been employed and generally are quite intricate and expensive, including those using reduced pressure to affect vaporization of a fluid.

Exemplary of this latter type of system is U.S. Pat. No. 991,161 granted on May 2, 1911 to E. H. McHenry. This system, however, does not maintain a reduced pressure within the solar panels but has a separate expansion chamber, thereafter using the vapor generated to drive a motor. Furthermore, his device has no means responsive to the temperature of the solar panels to effect automatic activation of the system when the solar panel temperature is high enough to ensure vaporization and to drain the panels when the temperature thereof falls below the freezing point of the liquid used.

Accordingly, it is an object of the present invention to provide a novel solar heating system which is relatively simple and relatively economical to manufacture and wherein the solar panels are maintained at a reduced pressure to facilitate vaporization of the fluid used and subsequent utilization of the latent heat of vaporization of such fluid.

It is also an object to provide such a solar heating system which operates automatically in response to the temperature sensed at the solar panels and that sensed in the fluid of a secondary system to which heat is transferred for utilization as desired.

Another object is to provide such a solar heating system wherein the solar panels are automatically drained if the temperature thereof falls below a preset value.

SUMMARY OF THE INVENTION

It has now been found that the foregoing and related objects of the present invention are readily attained in a solar heating system comprising a condenser and solar heating panel means having a liquid inlet, a vapor outlet, and passage means extending therebetween, the solar heating panel means absorbing heat from the sun to convert liquid therein to vapor. A first conduit has one end connected to the vapor outlet of the solar heating panel means and the other end to a fluid pump operable to pump fluid through the solar heating system, and a second conduit has one end connected to the fluid pump and the other end connected to the liquid inlet of the solar heating panel means.

A vacuum pump is operable to provide a reduced pressure in the solar heating panel means, more specifically, within the passage means thereof, to reduce the pressure acting on liquid contained therein and the condenser is disposed along a portion of the first conduit whereby vapor passing therethrough is in indirect heat exchange contact with a heat exchange fluid in the condenser and condenses with the latent heat of vaporization thereof being transferred to the heat exchange fluid.

In the preferred aspect of the invention the solar heating system further includes control means having a pressure sensing member operable to monitor the pressure within the solar heating panel means, the control means activating the vacuum pump when the pressure sensed within the solar heating panel means exceeds a predetermined value and deactivating the vacuum pump when the pressure sensed within the solar heating panel means is less than the predetermined value and during operation of the solar heating system.

The control means also includes a heat sensing member communicating with the solar heating panel means operable to monitor the temperature therewithin, the control means activating the heat transfer system when the temperature sensed in the solar heating panel means exceeds a first preset value and deactivating the system when the temperature sensed therewithin falls below the first preset value.

A second heat sensing member communicates with the condenser and is operable to monitor the temperature of heat exchange fluid therewithin, the control means activating the heat transfer system when the temperature sensed in the condenser falls below a second preset value and deactivating the system when the temperature sensed therewithin exceeds the preset value.

Also in the preferred embodiment of the invention, a liquid storage tank member is disposed at a lower evaluation than the solar heating panel means and is connected to the second conduit by a third conduit. The control means further includes a first valve disposed along the third conduit and is operable to close the first valve and activate the fluid pump during operation of the solar heating system and to open the first valve and deactivate the fluid pump upon termination of the operation of the system whereby fluid in the solar heating panel means drains through the second and third conduits into the tank member.

The vacuum pump communicates with the solar heating panel means through a fourth conduit, and a fifth conduit connects the upper portion of the tank member to the fourth conduit, the third conduit being connected to the tank member at a point below the liquid level therein. A second valve is disposed along the fourth conduit intermediate the fifth conduit and solar heating panel means, and a third valve is disposed along the fifth conduit, the control means being operable to close the second valve, open the third valve, and activate the vacuum pump for a predetermined time period upon termination of the operation of the solar heating system whereby the vacuum pump facilitates draining fluid from the solar heating panel means into the tank member. A sixth conduit connects the first and third conduits whereby excess fluid pressure is released into the tank member.

The condenser preferably comprises a tank having an inlet and outlet for heat exchange fluid passing therethrough with a portion of the first conduit extending through the tank in direct contact with heat exchange fluid therein.

In the preferred embodiment, the solar heating panel means comprises a laminate of two sheets of metallic material cooperatively configured to define the passage means therebetween which include a plurality of passages interconnecting a plurality of cavities enlarged relative thereto. The laminate is mounted within a housing having a translucent surface generally coextensive with and spaced from the laminate and insulating material disposed therewithin adjacent the surface of the laminate opposite the translucent surface.

DETAILED DESCRIPTION OF THE ILLUSTRATED EMBODIMENT

Figure 1:
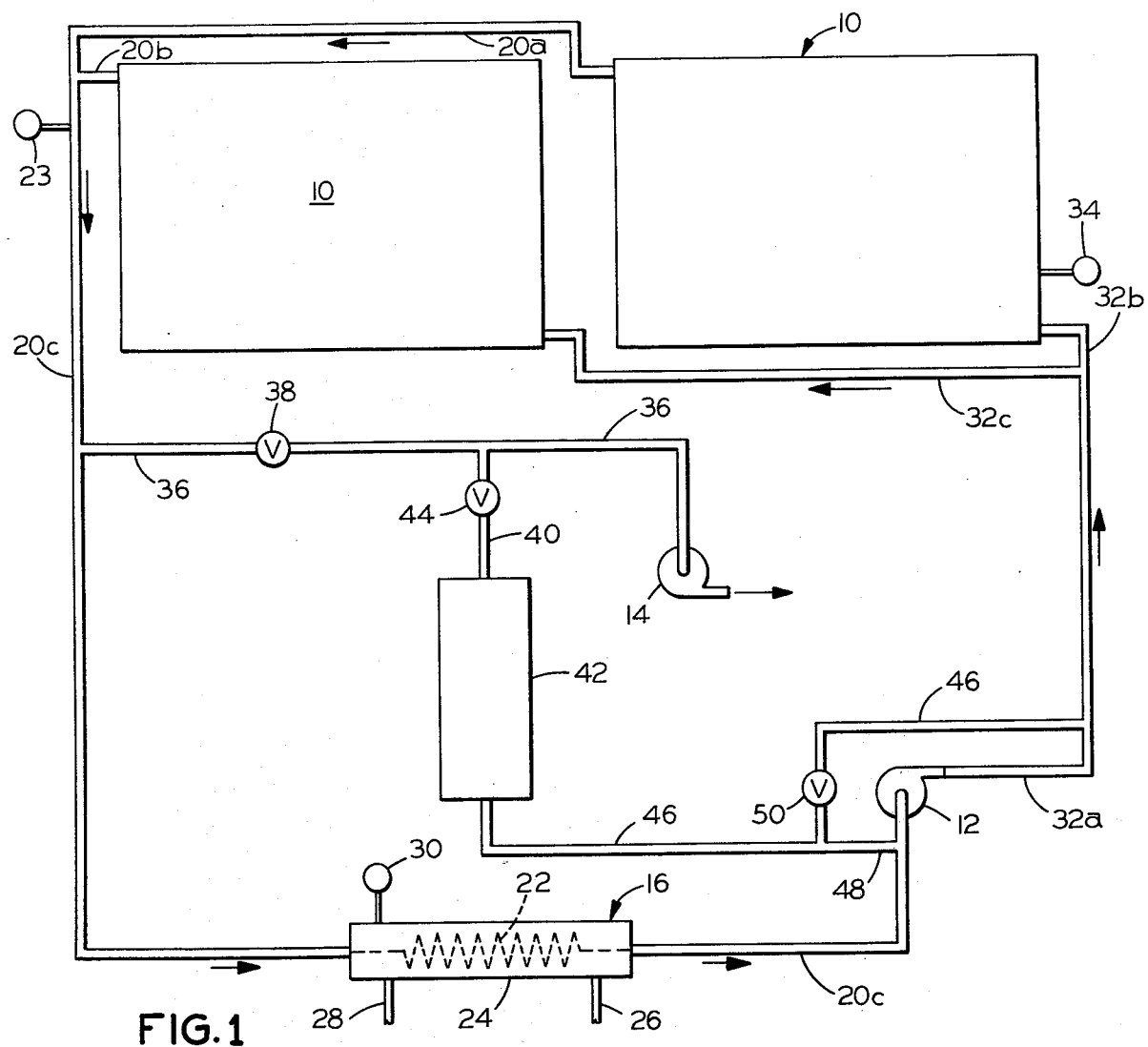
FIG. 1 is a diagrammatic illustration of a solar heating system embodying the present invention.

Turning now to the attached drawings in detail and in particular to FIG. 1 thereof, illustrated therein is a solar heating system embodying the present invention comprising a pair of solar panels each generally designated by the numeral 10, a liquid pump 12 operable to pump liquid through the system, a vacuum pump 14 operable to reduce the pressure within the solar panels 10, and a condenser generally designated by the numeral 16 operable to transfer heat absorbed by the fluid circulating through the solar panels 10 to a secondary system for whatever purpose is desired.

The solar panels 10 are connected to the liquid inlet side of the pump 12 by conduits 20a, b, c with conduit 20c extending through the condenser 16 and having a helical configuration therewithin as shown at 22. A pressure sensing probe 23 is in communication with the interior of conduit 20c adjacent the solar panels 10 to monitor the pressure therewithin and is part of a control system described hereinafter. Alternatively, the probe 23 may be connected directly within one of the solar panels 10.

The condenser 16 comprises a jacket or tank 24 having a fluid inlet 26 and fluid outlet 28, and also has a temperature probe 30 connected thereto to monitor the temperature of heat exchange fluid therewithin. The helical configuration of the portion of conduit 20c within the jacket 24 increases the effective length of heat transfer surface between the primary system and heat exchange fluid.

Connecting the outlet side of the pump 12 to the solar panels 10 are conduits 32a, b, c, which complete the basic circuit of the system which comprises the panels 10, conduits 20, pump 12, and conduits 32. A temperature probe 34 is connected to one of the solar panels 10 to monitor the temperature therewithin for a purpose described hereinafter.

The vacuum pump 14 communicates with conduit 20c through the conduit 36 in which is disposed a solenoid controlled valve 38 operable to connect and disconnect the pump 14 from the conduit 20c and thereby communication with the panels 10.

Connected to the conduit 36 intermediate the valve 38 and vacuum pump 14 is a conduit 40 which connects to the upper portion of a liquid storage tank 42 which is disposed at a lower elevation than the solar panels 10. A solenoid controlled valve 44 in the conduit 40 controls communication between the vacuum pump 14 and tank 42.

The lower portion of the tank 42 is connected by conduit 46 to conduit 32a with the solenoid controlled valve 50 on conduit 46 controlling fluid flow therethrough. Conduit 48 connects conduits 20c, 46 to provide a flow path between the tank 42 and conduit 20c.

Figure 2:
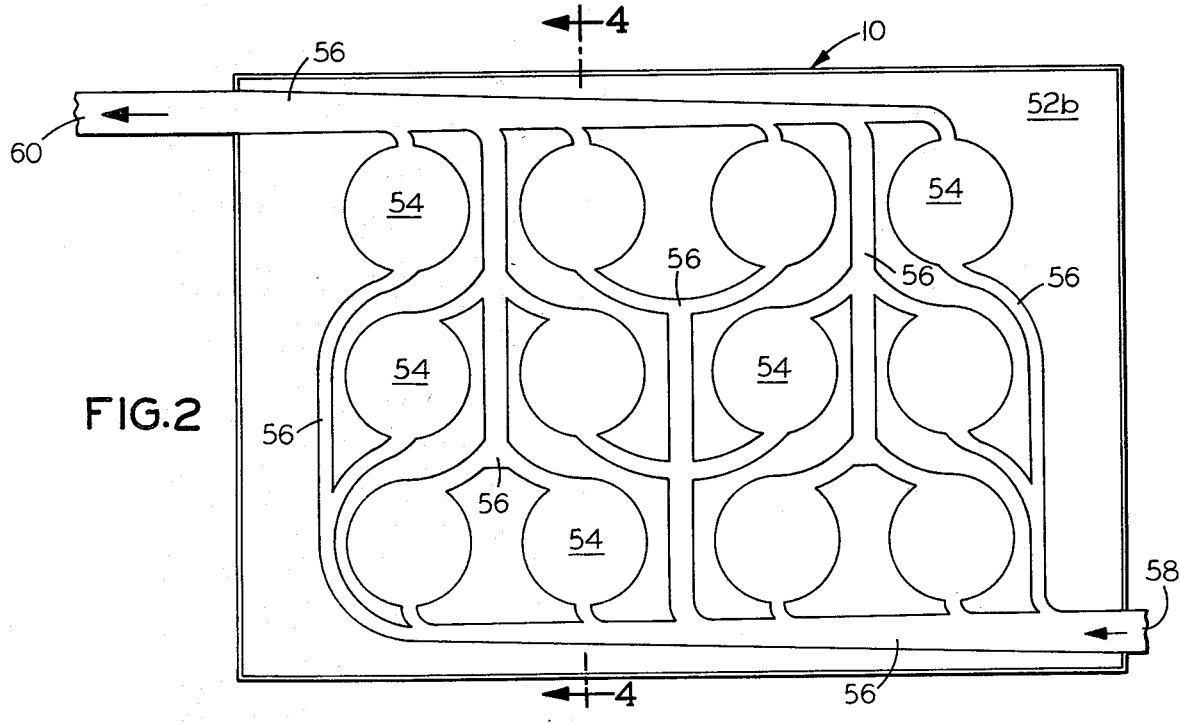
FIG. 2 is a partially diagrammatic view illustration of the conduits and chambers in the solar panel of FIG. 1.
Figure 4:
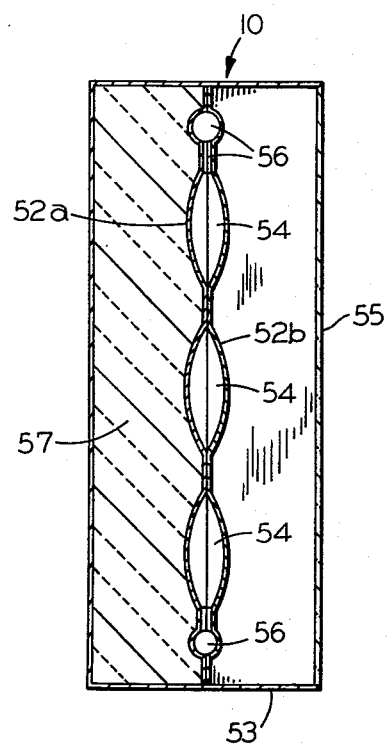
FIG. 4 is a sectional view of a solar panel along the line 4—4 of FIG. 2.

Each of the solar panels 10, as best seen in FIGS. 2 and 4, is a laminate of a pair of metallic sheets 52a, b configured to define a multiplicity of cavities 54 and interconnecting passages 56 of reduced dimension therebetween. Each of the cavities 54 communicates with the liquid inlet 58 and vapor outlet 60 by suitable passages 56 which taper to a reduced cross section away from the inlet 58 and outlet 60 to reduce turbulence in fluid flow. The laminate of the metallic sheets 52 is mounted in a box-like housing 53 having a translucent top panel 55 coextensive with the laminate of the sheets 52 and spaced therefrom to provide an air space therebetween. Insulating material 57 is disposed within the housing 53 between the opposite panel and the laminate to reduce heat loss, and the outer surface of top sheet 52b is black to enhance absorption of solar energy.

Figure 3:
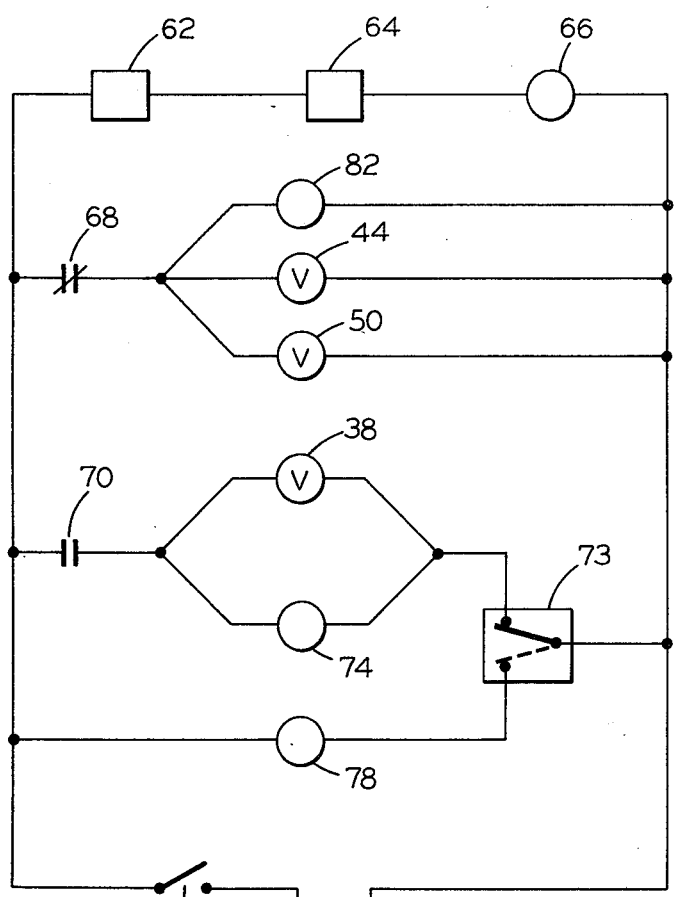
FIG. 3 is a diagrammatic illustration of a control circuit for the solar system of FIG. 1.
Figure 3:
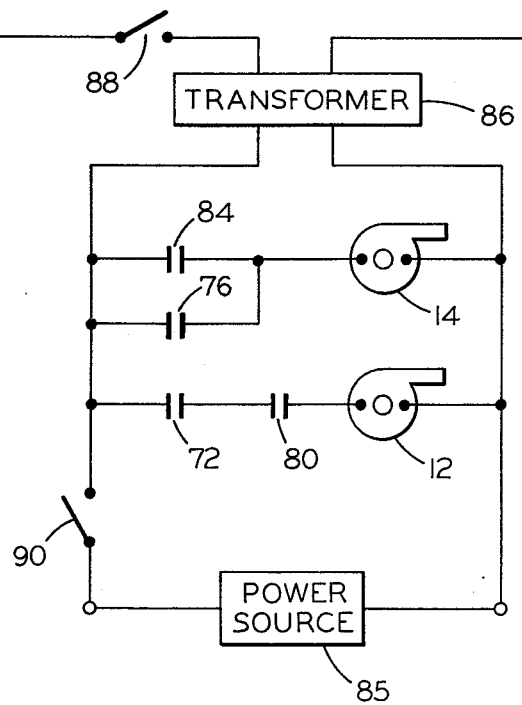

The operation of the present invention will now be described in conjunction with the control system therefor shown diagrammatically in FIG. 3.

Initially, for the system to commence operation automatically the temperature of the solar panels 10 must be greater than a preset value to ensure that the liquid therein will vaporize. Since the cavities 54 and passages 56 of the solar panels 10 are maintained at a reduced pressure during operation, the normal vaporization temperature of the liquid used is reduced correspondingly to a value at or below the preset temperature value. Furthermore, the temperature of heat exchange fluid circulating through the condenser 16 from a secondary circuit must be lower than a preset value before the system automatically commences operation.

Once the temperature sensed at the panels 10 by the probe 34 exceeds the preset value and that of heat exchange fluid sensed by the probe 30 is less than its preset value, the contacts of temperature sensors 62, 64 connected to the probes 30, 34 respectively, close to energize relay 66 which effects control over switches 68, 70, 72. In response to the energization of relay 66, switch 68 opens to close valves 44, 50, thus precluding passage of fluid through conduits 40, 46. Switches 70, 72 are closed when relay 66 is energized.

If the pressure sensed in the cavities 54 and passages 56 of the solar panels 10 is greater than the value at which the system is to operate, a calibrated pressure sensitive switch 73 connected to the probe 23 is in the position shown in solid line and energizes relay 74 and opens valve 38 to provide communication between the vacuum pump 14 and conduit 20c. Relay 74 when energized closes switch 76 to activate vacuum pump 14, which operates until the pressure sensed by probe 23 is reduced below the preset level. At that point, the pressure sensitive switch 73 moves to the position shown in dashed lines to energize relay 78, close valve 38, and deactivate vacuum pump 14 by de-energizing relay 74, thus opening the contacts 76 thereof.

Energization of relay 78 closes the contacts 80 thereof, and since switch 72 was previously closed by energization of relay 66, the fluid circulating pump 12 commences operation to pump fluid through the system. Prior to activation of the pump 12 all fluid within the system was stored within the tank 42 and the portions of the conduits 20c, 32a, 46, 48 at or below the liquid level in the tank 42.

As liquid enters the solar panels 10 through conduits 32b, c it vaporizes at the reduced pressure, the enlarged cavities 54 being designed to accommodate the larger volume upon vaporization. This vapor exits the panels 10 through the conduits 20a, b, passes through conduit 20c, and condenses while passing through the condenser 16 to release its latent heat of vaporization to heat exchange fluid within the condenser 16. The fluid in conduit 20c exits the condenser 16 as liquid and is recycled through the solar panels 10 by pump 12. Excess fluid pressure is released by releasing some fluid through conduits 48, 46 into the tank 42.

If the temperature sensed by probe 34 falls below its preset value or if that sensed by probe 30 exceeds its preset value, the contacts of one or both of temperature sensors 62, 64 open to de-energize relay 66. Upon de-energization of relay 66, switch 72 opens to deactivate pump 12, switch 68 closes to open valves 44, 50 and energize a timing relay 82, and switch 70 opens to ensure that valve 38 remains closed no matter what position switch 73 may be in. The timing relay 82 closes switch 84 for a predetermined period of time to activate the vacuum pump 14 which is now in communication with the upper portion of the tank 42, the reduced pressure in the tank 42 facilitating draining fluid from the solar panels 10 into conduits 32, 48, 46, 20c and tank 42.

The tank 42 has a volume sufficient to store the liquid of the system when the panels 10 are drained, and functions during operation of the system as an expansion tank whereby excess liquid may pass into the tank 42 through conduits 48 and 46.

A power supply 85, conveniently 120 volt line power, provides power to operate the pumps 12, 14, a transformer 86 stepping down the line voltage to a value for which the relays 66, 74, 78, 82 are designed. A switch 88 permits disconnection of the relay portion of the control circuit and a switch 90 permits disconnection of the complete circuit from the power supply 85.

The system of the present invention utilizes water for economy as the solar panels drain automatically when the temperature therewithin falls below a preset value, thus effectively eliminating any problems caused by fluid freezing in the panels. Other fluids may be used with appropriate settings for the temperature and pressure values for the sensors but care should be taken so that any substances remaining following vaporization do not clog any of the passages, conduits, or valves.

The solar panels are preferably configured as described hereinbefore, the metallic sheets thereof being stamped from stainless steel or aluminum and secured together by welding, brazing or the like. Virtually any configuration may be used as long as it will accommodate the increased volume upon vaporization and is able to withstand reduced pressure therewithin.

With water, the preferred operating pressure is on the order of 0.33 kilogram per square centimeter and correspondingly the solar panel temperature should exceed about 75° C. before operation commences to ensure fluid vaporization. Clearly the operating pressure and temperature may be varied according to the desires of the user and the strength of the solar panels. Any number and size of solar panels may be used, it being understood that the extended surfaces thereof should be oriented to intercept the maximum amount of solar energy. Furthermore, the solar panel housing should be well insulated from any external heat sinks as well as having insulation therewithin as described.

The control system functions preferably as described to control automatically the commencement and termination of the operation of the solar heating system in response to the temperatures sensed in the solar panel and heat exchange fluid. Alternatively, the system may operate automatically solely in response to the temperature sensed in the solar panels by manually closing the contacts of the temperature sensor connected to the probe monitoring the temperature of heat exchange fluid. Furthermore, the system may be completely controlled manuallly by closing the contacts of both [thermostats] temperature sensors and simply utilizing the switches 88, 90. The vacuum pump may also be controlled manually by overriding the pressure sensitive switch.

Thus, it can be seen that the present invention provides a novel solar heating system which is relatively simple and economical to manufacture and wherein the solar panels are maintained at a reduced pressure to facilitate vaporization of the fluid used. The system operates automatically in response to the temperature sensed at the solar panels and that sensed in the fluid of a secondary system to which heat is transferred. Furthermore, the solar panels drain automatically if the temperature thereof falls below a present value.

Having thus described the invention, I claim:

1. A solar heating system comprising:

A. solar heating panel means having a liquid inlet, a vapor outlet, and passage means extending therebetween, said solar heating panel means absorbing heat from the sun to convert liquid contained within said passage means to vapor, said solar heating panel means comprising a laminate of two sheets of metallic material cooperatively configured to define said passage means therebetween which include a plurality of passages interconnecting a plurality of cavities enlarged relative thereto, and a housing within which is mounted said laminate, said housing having a translucent surface generally coextensive with and spaced from said laminate and insulating material disposed therewithin adjacent the surface of said laminate opposite said translucent surface;

B. fluid pump means having an inlet side and an outlet side;

C. first conduit means having one end connected to said vapor outlet of said solar heating panel means and the other end connected to said inlet side of said fluid pump means;

D. condensng means having a fluid inlet and a fluid outlet and disposed along a portion of said first conduit means between said vapor outlet of said panel means and said inlet side of said fluid pump means, said condensing means being adapted to have a heat exchange fluid passed therethrough in indirect heat exchange with vapor in said portion of said first conduit to condense such vapor with latent heat of vaporization thereof being transferred to said heat exchange fluid, said first conduit serving to conduct liquid so condensed to said fluid pump inlet;

E. second conduit means having one end connected to said outlet side of said pump means and the other end connected to said liqiud inlet of said solar heating panel means to conduct liquid condensed in said condensing means back to said solar heating panel means;

F. vacuum means connected at a point along a path, defined at least in part by said first conduit means, between said passage means of said solar heating panel and said condensing means to provide a reduced pressure acting on liquid being vaporized therein whereby the normal vaporization temperature of said liquid is reduced.

2. A solar heating system comprising:

A. solar heating panel means having a liquid inlet, a vapor outlet, and passage means extendng therebetween, said solar heating panel means absorbing heat from the sun to convert liquid contained within said passage means to vapor;

B. fluid pump means having an inlet side and an outlet side;

C. first conduit means having one end connected to said vapor outlet of said solar heating panel means and the other end connected to said inlet side of said fluid pump means;

D. condensing means having a fluid inlet and a fluid outlet and disposed along a portion of said first conduit means between said vapor outlet of said panel means and said inlet side of said fluid pump means, said condensing means being adapted to have a heat exchange fluid passed therethrough the indirect heat exchange with vapor in said portion of said first conduit to condense such vapor with latent heat vaporization thereof being transferred to said heat exchange fluid, said first conduit serving to conduct liquid so condensed to said fluid pump inlet;

E. second conduit means having one end connected to said outlet side of said pump means and the other end connected to said liquid inlet of said solar heating panel means to conduct liquid condensed in said condensing means back to said solar heating panel means;

F. vacuum means connected at a point along a path, defined at least in part by said first conduit means, between said passage means of said solar heating panel and said condensing means to provide a reduced pressure in said passage means to reduce the pressure acting on liquid being vaporized therein whereby the normal vaporization temperature of said liquid is reduced; and G. control means having a pressure sensing member operable to monitor the pressure within said solar heating panel means, said control means activating said vacuum means when the pressure sensed within said solar heating panel means exceeds a predetermined value and deactivating said vacuum means when the pressure sensed within said solar heating panel means is less than the predetermined value and during operation of the said solar heating system.

3. The solar heating system of claim 2 wherein said control means further includes a heat sensing member communicating with said solar heating panel means operable to monitor the temperature therewithin, said control means activating said heat transfer system when the temperature sensed in said solar heating panel means exceeds a first preset value and deactivating said system when the temperature sensed therewithin falls below said first preset value.

4. The solar heating system of claim 3 wherein said control means further includes a second heat sensing member communicating with said condensing means operable to monitor the temperature of heat exchange fluid therewithin, said control means activating said heat transfer system when the temperature sensed in said condensing means falls below a second preset value and deactivating said system when the temperature sensed therewithin exceeds said preset value.

5. The solar heating system of claim 2 further including a liquid storage tank member disposed at a lower elevation than said solar heating panel means; third conduit means connecting said second conduit means to said tank member; and wherein said control means further includes first valve means disposed along said third conduit means, said control means being operable to close said first valve means and activate said fluid pump means during operation of said solar heating system and to open said first valve means and deactivate said fluid pump means upon termination of the operation of said system whereby fluid in said solar heating panel means drains through said second and third conduit means into said tank member.

6. The solar heating system of claim 5 further including fourth conduit means through which said vacuum means communicates with said solar heating panel means; fifth conduit means connecting the upper portion of said tank member to said fourth conduit means; and wherein said third conduit means is connected to said tank member at a point below the liquid level therein, said control means further including second valve means disposed along said fourth conduit means intermediate said fifth conduit means and said solar heating panel means and third valve means disposed along said fifth conduit means, said control means being operable to close said second valve means, open said third valve means, and activate said vacuum means for a predetermined time period upon termination of the operation of said solar heating system whereby said vacuum means facilitates draining fluid from said solar heating panel means into said tank member.

7. The solar heating system of claim 5 further including sixth conduit means connecting said first and third conduit means whereby excess fluid pressure is released into said tank member.

8. The solar heating system of claim 2 wherein said condensing means comprises a tank having an inlet and outlet for heat exchange fluid passing therethrough, and said portion of said first conduit means extends through said tank in direct contact with heat exchange fluid therein.

9. The solar heating system of claim 2 wherein said solar heating panel means comprises a laminate of two sheets of metallic material cooperatively configured to define said passage means therebetween which include a plurality of passages interconnecting a plurality of cavities enlarged relative thereto.

10. A solar heating system comprising:

A. solar heating panel means having a liquid inlet, a vapor outlet, and passage means extending therebetween, said solar heating panel means absorbing heat from the sun to convert liquid contained within said passage means therein to vapor;

B. fluid pump means having an inlet side and an outlet side;

C. first conduit means having one end connected to said vapor outlet of said solar heating panel means and the other end to said inlet side of said fluid pump means;

D. second conduit means having one end connected to said outlet side of said pump means and the other end connected to said liquid inlet of said solar heating panel means;

E. condensing means having a heat exchange fluid inlet and a heat exchange fluid outlet and being disposed along a portion of said first conduit means whereby vapor passing therethrough is passed in indirect heat exchange with a heat exchange fluid passed through said condensing means and condenses with the latent heat of vaporization thereof being transferred to said heat exchange fluid;

F. vacuum means operable to provide a reduced pressure in said passage means of said solar heat absorbing panel means to reduce the pressure acting on liquid contained therein;

G. control means having a pressure sensing member operable to monitor the pressure within said solar heating panel means, said control means activating said vacuum means when the pressure sensed within said solar heating panel means exceeds a predetermined value and deactivating said vacuum means when the pressure sensed within said solar heating panel means is less than the predetermined value and during operation of said solar heating system;

H. a liquid storage tank member having an upper portion and disposed at a lower elevation than said solar heating panel means; third conduit means connecting said second conduit means to said tank member; said control means further including first valve means disposed along said third conduit means, said control means being operable to close said first valve means and activate said fluid pump means during operation of said solar heating system and to open said first valve means and deactivate said fluid pump means upon termination of the operation of said system whereby fluid in said solar heating panel means drains through said second and third conduit means into said tank member; and I. fourth conduit means through which said vacuum means communicates with said solar heating panel means; fifth conduit means connecting the upper portion of said tank member to said fourth conduit means; said third conduit means being connectd to said tank member at a point below the liquid level therein, said control means further including second valve means disposed along said fourth conduit means intermediate said fifth conduit means and said solar heating panel means and third valve means disposed along said fifth conduit means, said control means being operable to close said second valve means, open said third valve means, and activate said vacuum means for a predetermined time period upon termination of the operation of said solar heating system whereby said vacuum means facilitates draining fluid from said solar heating panel means into said tank member.

* * * * *